(12) United States Patent
Shaban et al.

(10) Patent No.: US 10,696,770 B2
(45) Date of Patent: Jun. 30, 2020

(54) SALT-RESISTANT HYDROPHOBICALLY MODIFIED COPOLYMER NANOSTRUCTURES AS VISCOSITY INCREASING AGENTS FOR ENHANCED OIL RECOVERY

(71) Applicants: Masoom Shaban, Tehran (IR); Ahmad Ramazani Saadatabadi, Tehran (IR); Mohammad Mahdi Ahadian, Tehran (IR)

(72) Inventors: Masoom Shaban, Tehran (IR); Ahmad Ramazani Saadatabadi, Tehran (IR); Mohammad Mahdi Ahadian, Tehran (IR)

(*) Notice: Subject to any disclaimer, the term of this patent is extended or adjusted under 35 U.S.C. 154(b) by 62 days.

(21) Appl. No.: 15/989,151

(22) Filed: May 24, 2018

(65) Prior Publication Data

US 2018/0371137 A1 Dec. 27, 2018

Related U.S. Application Data

(62) Division of application No. 15/188,671, filed on Jun. 21, 2016, now abandoned.

(51) Int. Cl.
*C08F 2/24* (2006.01)
*C08F 2/32* (2006.01)
*C08F 220/54* (2006.01)
*C08F 220/56* (2006.01)

(52) U.S. Cl.
CPC .......... *C08F 220/54* (2013.01); *C08F 220/56* (2013.01); *C08F 2/24* (2013.01); *C08F 2/32* (2013.01)

(58) Field of Classification Search
None
See application file for complete search history.

(56) References Cited

U.S. PATENT DOCUMENTS

| 8,790,491 B2 | 7/2014 | Souzy et al. |
| 2015/0197660 A1* | 7/2015 | Ronne ............ C08J 3/092 524/432 |
| 2017/0037300 A1* | 2/2017 | Li ............ C08F 2/22 |

FOREIGN PATENT DOCUMENTS

| CN | 101397351 A | 4/2009 |
| WO | 2009036160 A1 | 3/2009 |
| WO | 2014012810 A1 | 1/2014 |

OTHER PUBLICATIONS

Puig, J. E. et al. "Inverse Microemulsion Copolymerization of Styrene and Acrylic Acid". Annual Technical Conference—Society of Plastics Engineers 1991, 49th, 1145-1148. (Year: 1991).*
Puig, J. E. et al., "Microemulsion Copolymerization of Styrene and Acrylic Acid", Journal of Colloid and Interface Science 1990, 137(1).

* cited by examiner

*Primary Examiner* — Richard A Huhn
(74) *Attorney, Agent, or Firm* — NovoTechIP International PLLC

(57) ABSTRACT

A hydrophobically modified copolymer nanostructure includes a first monomer and a second monomer. The first monomer is a hydrophilic monomer. The second monomer is a non-ionic short-chain hydrophobic monomer. The first monomer and the second monomer form a microblock structure, forming nanoparticles. The microblock structure is the hydrophobically modified copolymer nanostructure.

12 Claims, 6 Drawing Sheets

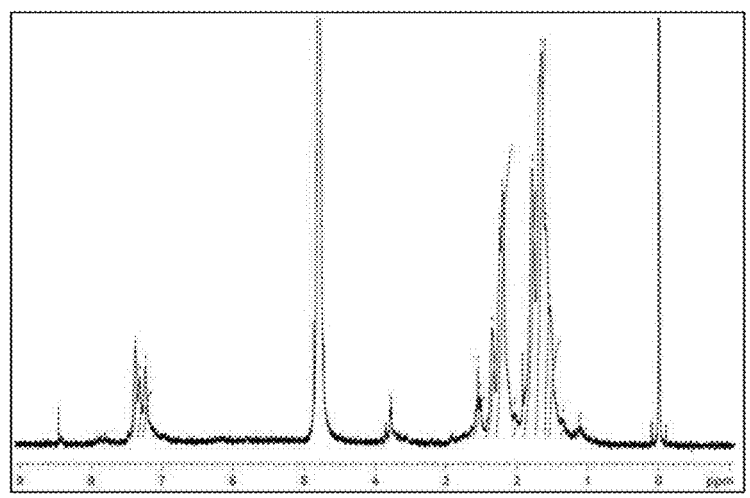
FIG.3
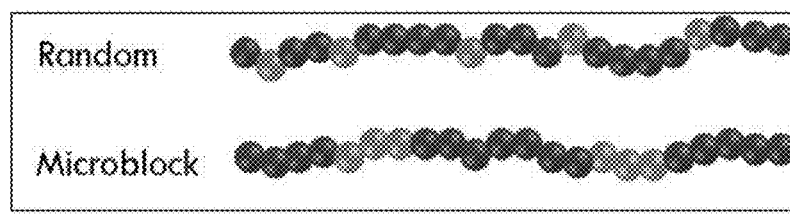
FIG.4
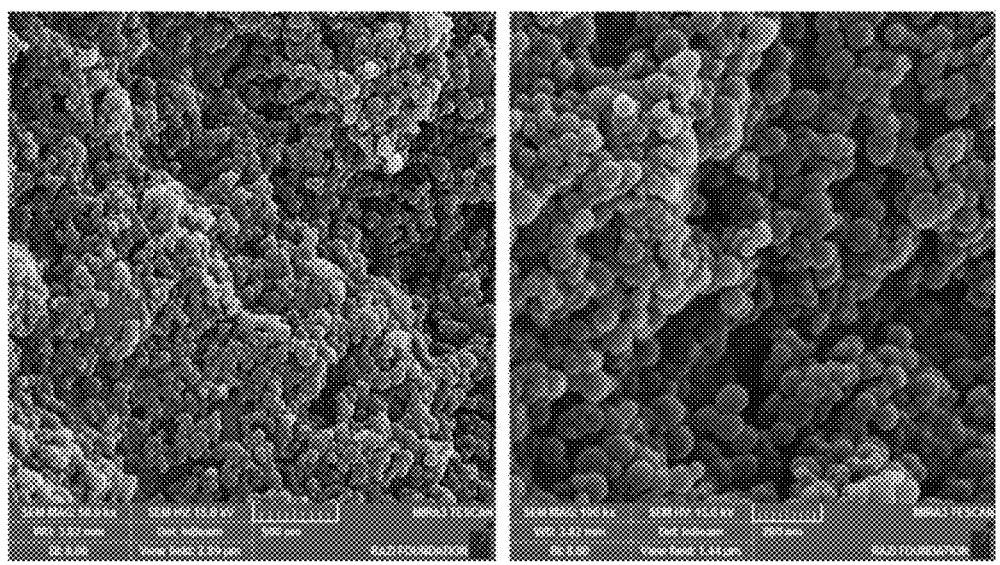
FIG.5A                    FIG.5B

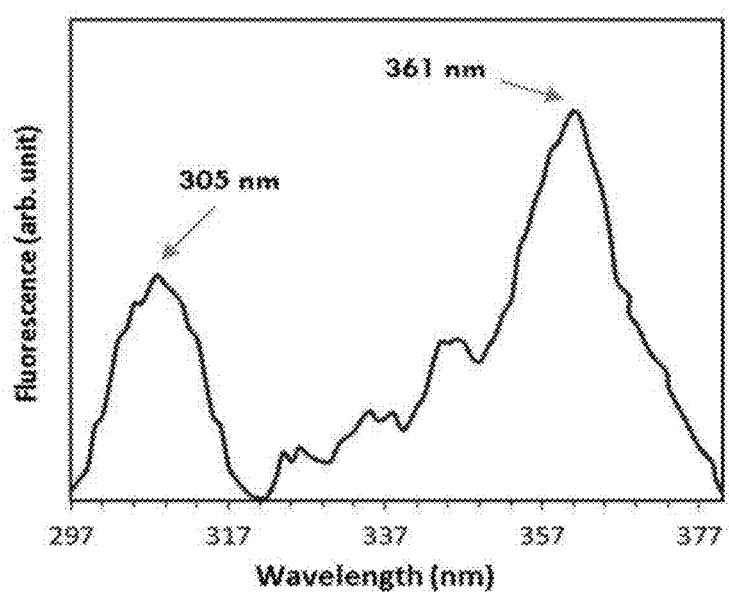
FIG.6
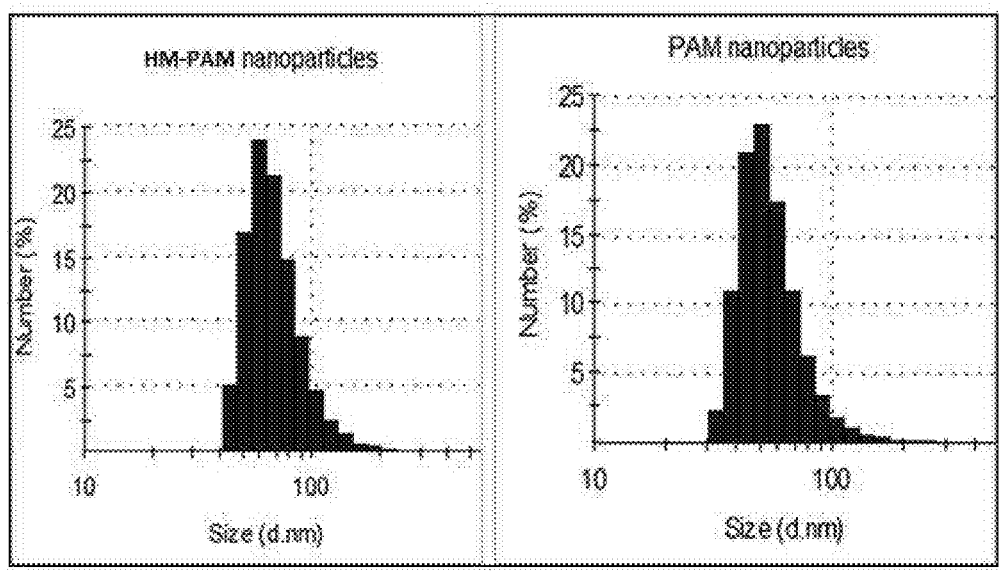
FIG.7A                    FIG.7B (1)

SALT-RESISTANT HYDROPHOBICALLY MODIFIED COPOLYMER NANOSTRUCTURES AS VISCOSITY INCREASING AGENTS FOR ENHANCED OIL RECOVERY

CROSS REFERENCE TO RELATED APPLICATION

This application claims the benefit of priority to an Iran patent application having serial number 139450140003003488 filed on Jun. 22, 2015, which is incorporated by reference herein in its entirety.

TECHNICAL FIELD

The present disclosure relates generally to oil extraction and, more particularly, to polymer flooding processes for oil recovery. Also it relates to other applications such as cosmetics, coatings and drilling fluids.

BACKGROUND

In the context of oil extraction, oil reservoirs can be fractured, thereby trapping oil even upon completion of classical oil recovery processes, such as water flooding, gas injection and in-situ combustion. There are known processes, sometimes referred to as "secondary" and "tertiary" oil recovery, aimed at recovering portions of this trapped oil. One such process is polymer flooding. This is a flooding process that uses natural polymers, such as xanthan and starch, and synthetic polymers, for example, polyacrylamide (PAM) and partially hydrolyzed polyacrylamide (HPAM). The polymer can increase the viscosity of the injected water. This can increase sweep efficiency due to the improved mobility ratio, and can reduce the total volume of water required to reach the residual oil saturation. Use of PAM and HPAM, identified above, are known in the field of polymer flooding, generally for controlling the mobility ratio of water to oil. PAM and HPAM can increase the water viscosity, which hinders a phenomenon known as "water fingering" and, instead, operates to push the oil forward or to the front for retrieval.

The above-described operations of PAM and HPAM result from the high molecular weight of the polymers and the repulsion between the negative charges along the polymer chain of HPAM, each being based on maximum chain extension. A limitation of traditional polymer flooding, however, is that the polymer chains exhibit degradations during the flooding process. Examples include thermal degradation, as well as mechanical, salinity, shear and biological degradations of polymer chains during the flooding process.

In addition, shearing and heating in wellbores and reservoirs often decrease the polymer viscosity. Polymer solutions, as any non-Newtonian fluid, conform to the power law, including viscosity, shear rate, consistency index, and flow behavior index. The polymer solution viscosity is thus easily calculated under any shear rate based on the determined consistency and flow behavior indexes. As is understood in the art, the consistency index increases with increasing polymer concentration, but decreases with increasing temperature. On the other hand, the flow behavior index decreases with increasing polymer concentration, and slightly increases at high temperature. Therefore, it should be understood that a higher HPAM concentration leads to higher viscosities, and polymer viscosity is reduced at a higher shear rate and temperature.

SUMMARY

Disclosed aspects include a salt-resistant hydrophobically modified copolymer nanostructure, and a process for producing it. Features and advantages can include salt-resistance and being neutral non-ionic. Related features include use of the disclosed salt-resistant hydrophobically modified copolymer nanostructure as a viscosity increasing agent for enhanced oil recovery. As will be appreciated from this disclosure, salt-resistant hydrophobically modified copolymer nanostructure according to this disclosure can protect water-soluble polymers from rapid degradations and mechanical shear stresses, both in surface facilities and near wellbores through porous media in underground reservoirs. Accordingly, polymer flooding with the hydrophobically modified copolymer nanostructures of the instant application can provide, among other features, increased oil recovery.

A disclosed method of synthesizing the salt-resistant hydrophobically modified copolymer nanostructure can include a first phase, a second phase and a third phase. In an aspect, the first phase can include producing an inverse nano-emulsion, by adding a solution of a surfactant, a hydrophilic monomer and an osmotic agent to an organic solvent under mechanical stirring. The second phase can include introducing the hydrophobic monomer to nano-emulsion, and then adding an initiator of a reaction that forms the hydrophobically modified copolymer nanostructure as a hydrophilic-hydrophobic copolymer having a microblock nanostructure. The third phase can include recovering the hydrophobically modified copolymer nanostructure from the organic solvent.

In an aspect, the hydrophilic monomer can include acrylamide, acrylic acid and their derivative, the hydrophobic monomer includes non-ionic short-chain monomer such as divinylbenzene, 4-methylstyrene, vinylcyclohexane, 4-vinylphenol, 4-vinylpyridine, 2-vinylnaphthalene, styrene and 1-vinylnaphthalene, the osmotic agent can include a sodium hydroxide solution. In another aspect, a surfactant with HLB of 2-6 is required. The organic solvent with high enough boiling point can include, for example, cyclohexane, benzene and heptane. In an aspect, the initiator can include an oil-soluble initiator such as azobisisobutyronitrile (AIBN), benzoyl peroxide (BPO) and lauroyl peroxide (LPO).

| Organic Solvents | Boiling point (° C.) |
| --- | --- |
| Benzene | 80.1 |
| cyclohexane | 80.74 |
| toluene | 110.6 |
| chlorobenzene | 131 |
| carbon tetrachloride | 76.72 |
| heptane | 98.42 |

The second phase can include, according to various aspects, a polymerization of the non-ionic short-chain hydrophobic monomer to form hydrophobic oligoradicals, at an organic phase. The polymerization can proceed until its concentration in organic phase saturates and the formed hydrophobic oligoradicals become insoluble in organic phase. The hydrophobic oligoradicals may then be repulsed by organic phase and start to accumulate on the micelles. In an aspect, the polymerization process can also proceed inside the micelles. These operations can result in a copolymerization of hydrophilic monomer inside the micelles and the hydrophobic monomer outside the micelles. The described copolymerization processes can continue to form the hydrophobically modified copolymer nanostructure as the hydrophobic-hydrophilic polymer having a microblock copolymer structure. In the described copolymerization processes, hydrophobic monomers can be grafted with the hydrophilic open end chains, to produce the salt-resistant hydrophobically modified copolymer nanostructure as a nanostructure of block copolymers.

The third phase can include separation of the hydrophobically modified copolymer nanostructure, by precipitation from the described solution. In an aspect, precipitation can include rinsing the hydrophobically modified copolymer nanostructure by methanol or acetone several times to separate the unreacted monomers and unreacted surfactant from the salt-resistant hydrophobically modified copolymer nanostructure. In addition, the synthesized salt-resistant hydrophobically modified can be further dried under vacuum.

BRIEF DESCRIPTION OF THE DRAWINGS

Features of the subject technology are set forth in the appended claims. However, for purpose of explanation, several implementations of the subject technology are set forth in the following figures.

FIG. 3 illustrates a nuclear magnetic resonance (HNMR) spectrum of the polyacrylamide and a preferred copolymer, according to an implementation.

FIG. 4 shows a schematic of the two possible structures for the hydrophobically modified copolymer nanostructure.

FIGS. 5A and 5B illustrate field-emission scanning electron microscopy (FE-SEM) images of the copolymer.

FIG. 6 illustrates a fluorescent spectrum of the copolymer HM-PAM.

FIGS. 7A and 7B show, respectively, a size distribution of the particles of the hydrophobically modified copolymer nanostructure and polyacrylamide based on dynamic light scattering (DLS) method.

DETAILED DESCRIPTION

Figure 1:
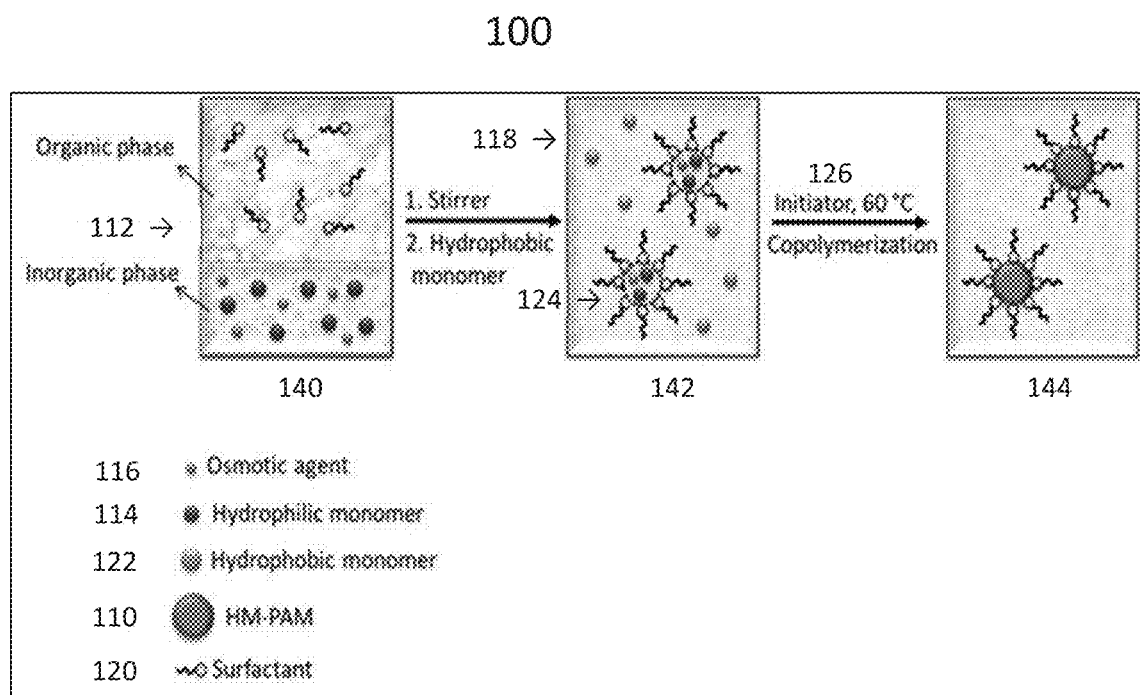
FIG. 1 illustrates a process for synthesizing a salt-resistant hydrophobically modified copolymer nanostructure as a viscosity-increasing agent for enhanced oil recovery, according to a preferred implementation of the instant application.

In the following detailed description, various examples are presented to provide a thorough understanding of inventive concepts, and various aspects thereof that are set forth by this disclosure. However, upon reading the present disclosure, it may become apparent to persons of skill that various inventive concepts and aspects thereof may be practiced without one or more details shown in the examples. In other instances, well known procedures, operations and materials have been described at a relatively high-level, without detail, to avoid unnecessarily obscuring description of inventive concepts and aspects thereof.

In traditional polymer flooding, a high viscosity polymeric solution, including hydrophilic polymer (for example, HPAM and PAM) and water, is injected into underground reservoirs by high viscosity pumps. The injecting can be after water flooding and its fingering phenomenon. This solution is injected to propagate through the water phase and control the mobility ratio of water to oil. However, as described above.

The chain extension approach leads to one of the greatest disadvantages of using PAM and HPAM in oil reservoirs. For example, when polyvalent salts are used in oilfield brine solutions, negative charges are extended from each other along the polymer chain by interaction with cations in the solution. The polymer chains no longer extend fully, which can cause the solution to have decreased viscosity due to the ion-dipole interaction between the salt cations and the oxygen atoms in polyacrylamide molecules. The strong ion-dipole interaction between the divalent cations, $Ca^{2+}$ and $Mg^{2+}$ and the amide group because of higher charge densities than $Na^+$, weakens the bond strengths of NaH and C=O bonds. These phenomena, in combination with various mechanical factors can lead to the chemical degradation of polymer molecules and a decrease in the polymer solution viscosity.

Examples of such mechanical factors include, first, the use of huge pumps and other equipment to inject the viscous polymer solution into the underground reservoirs. Second, mechanical, thermal and bacterial damages, as well as surface absorption, can result in the particular disadvantages in the use of hydrophilic polymers, such as PAM, HPAM, TVP, and xanthan during the traditional polymer flooding. Third, an increase in the water viscosity in undesired directions before reaching the remaining oil areas, and use of excessive polymers to increase viscosity in heavy oil reservoirs are other limitations of this traditional polymer flooding technique and approach.

The present application discloses a salt-resistant hydrophobically modified copolymer nanostructure, which after oil recovery by conventional water flooding, can be injected into underground reservoirs by low viscosity pumps, such as water pumps, as is understood in the art. Benefits of the salt-resistant hydrophobically modified copolymer nanostructure can include not only resistance to increased levels of water salinity, but also increasing the viscosity in presence of monovalent and divalent ions.

Regarding particle size, the average size of the pores in the porous media encountered in secondary and tertiary oil recover application is about 1 micrometer. Synthesized particles normally should be about one order of magnitude less than this size to permit adequate flow-through and prevent plugging. Therefore, assuming a porosity of micrometer, synthesized particles should be no more than 100 nanometers. In addition, even smaller particles can assist in obtaining a stable suspension of particles in water.

FIG. 1 illustrates an example process 100 for synthesizing a hydrophobically modified copolymer nanostructure 110 according to various aspects. For brevity of description, the hydrophobically modified copolymer nanostructure will be alternatively referenced as "hydrophobically modified HM-PAM." According to various aspects, the hydrophobically modified copolymer nanostructure 110 can exhibit, among other features, significant resistance to salt. Therefore, hydrophobically modified copolymer nanostructure 110 will be alternatively referenced as "salt-resistant hydrophobically modified HM-PAM" 110. The salt-resistant hydrophobically modified HM-PAM 110 in accordance with various aspects disclosed herein can exhibit characteristics, additional to salt resistance that can make it advantageous as a viscosity increasing agent for enhanced oil recovery.

The process 100 can be a modified inverse nano-emulsion process, defined according to concepts disclosed herein, for synthesizing salt-resistant hydrophobically modified HM-PAM 110, includes three phases 140, 142 and 144. The process 100 can begin at the first phase 140 with synthesizing a nano-emulsion 112.

The first phase 140 can be a synthesizing of a nano-emulsion 112 that includes acrylamides, acrylic acid and their derivative 114, sodium hydroxide 116, cyclohexane, benzene and heptane 118 and a surfactant with HLB of 2-6 120.

The acrylamide, acrylic acid or their derivative 114 may be added to the osmotic agent (0.1M sodium hydroxide solution) 118. Then the organic solvent 118 and the surfactant may be mixed in the reactor under homogenizer. The produced nano-emulsion 112 may be stirred mechanically and degassed by an inert gas for 30 minutes in a three-neck flask. The nano-emulsion is subsequently sent to the second phase 142.

The second phase 142 may include adding to the nano-emulsion 112 from phase one 140, non-ionic short-chain hydrophobic monomer such as styrene, divinylbenzene, 4-methylstyrene, vinylcyclohexane, 4-vinylphenol, 4-vinylpyridine, 2-vinylnaphthalene and 1-vinylnaphthalene 122, micelles 124 and organic solvent 126. The non-ionic short-chain hydrophobic monomer 122 is added to synthesized nano-emulsion 112 from first phase 140, while under mechanical stirring and degasification by an inert gas for another 30 minutes. Afterward, the reaction temperature may increase to 60° C. by a heater and the oil-soluble initiator 126, is added to the reactor. The co-polymerization takes place for 3-4 hours at 60° C. and under constant mechanical stirring and degasification by an inert gas, forming the hydrophobic-hydrophilic copolymer, which is the HM-PAM 100. Since the initiator 126 is an organic compound, the polymerization reaction starts at an organic, non-aqueous phase.

Referring to FIG. 1, as the polymerization of the non-ionic short-chain hydrophobic monomer 122 in organic phase proceeds, its concentration in organic solvent 118 saturates and the formed hydrophobic (oligoradicals) becomes poor-soluble in organic solvent 118. Hydrophobic oligoradicals may be repulsed by organic solvent 118 and start to accumulate on the micelles. The polymerization process also proceeds inside the micelles 124, which leads to copolymerization of hydrophilic monomer 118 inside the micelles 124 and the hydrophobic monomer 122 outside the micelles 124 and, further, to formation of the hydrophobic-hydrophilic block copolymer structure of the hydrophobically modified HM-PAM 110. The third phase 144 of the synthesis recovers the hydrophobically modified HM-PAM 110 from the solution.

The third phase 144 can include separation of the salt-resistant hydrophobically modified 110 from the solution by rinsing in methanol or acetone. The synthesized hydrophobically modified HM-PAM 110 inside the solution can be precipitated by methanol or acetone. The salt-resistant hydrophobically modified HM-PAM nanostructure 110 can be rinsed by methanol or acetone several times, and thereby separate out the unreacted monomers 114 and 116 and unreacted surfactant 120. The synthesized salt-resistant hydrophobically modified HM-PAM 110 can be further dried under vacuum.

In contrast to the above-described methods and operations, known methods for producing hydrophobically modified copolymers can include polymerizing hydrophilic monomer, and subsequently extending the chain with polymerizing hydrophobic monomer at the reactive end of the hydrophilic chains. The result has susceptibility to temperature degradation, as well as mechanical, salinity, shear and biological degradations of polymer chains during the flooding process.

Figure 2:
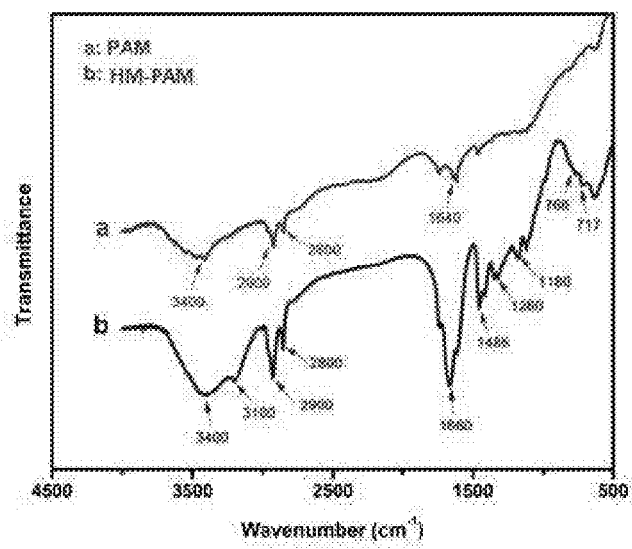
FIG. 2 illustrates a Fourier Transform Infra-Red (FT-IR) spectrum of the polyacrylamide and a preferred copolymer, according to an implementation.

FIG. 2 illustrates Fourier-Transform Infra-Red (FT-IR) spectra of the reactant and the synthesized copolymer nanostructure. Polyacrylamide (PAM) and copolymer (HM-PAM) spectra are shown. The peak at 3400 $cm^{-1}$ is amide group and the peak at 1660 $cm^{-1}$ is the carboxylic group in both polyacrylamide and the copolymer structures.

Characterization of the salt-resistant hydrophobically modified HM-PAM nanostructure properties pursuant to the present application can be done, for example, by Dynamic light scattering (DLS), Fourier Transform Infra-red spectroscopy (RT-IR), Field-emission scanning electron microscopy (FE-SEM), nuclear magnetic resonance spectroscopy (NMR), Ubbelohde viscometer and rheometer.

FIG. 3 shows the Nuclear Magnetic Resonance ($^1$HNMR) spectrum. The HNMR was done in $D_2O$. Different aromatic and aliphatic C—H peaks can be seen. Peak at 1.7 ppm relates to a —$CH_2$ group and the peak at 2.3 ppm is a —CH— group. It should be noted that the peak at 4.8 ppm is related to the solvent.

According to FIG. 4, there are two different possible structures for the hydrophobically modified HM-PAM, which are: random structure and microblock structure. The microblock structure has a greater number of molecular interactions than the random structure. The microblock structure therefore has increased viscosity at low concentration when compared to the random structure. Accordingly, the reaction parameters described above are configured to favor synthesizing the microblock structure.

The salt-resistant hydrophobically modified copolymer nanostructure also shows fluorescence properties. FIG. 6 illustrates the fluorescence spectrum of the HM-PAM. The random structure has fluorescence emission at 305 nm and the microblock structure has fluorescence emission at 361 nm. As can be seen, the intensity of the fluorescent emission of the microblock structure is twice the intensity of the random structure. This indicates the microblock structure being the dominant composition in the hydrophobically modified HM-PAM nanostructure according to this disclosure.

FIGS. 5A and 5B show the morphology of the HM-PAM using a Field-Emission Scanning Electron Microscope (FE-SEM). FIG. 7 particle size distribution by a using a Dynamic Light Scattering (DLS). The results show that the spherical nanoparticles are approximately 70 nm in diameter. The nano metric size of the molecules enhances the solubility of the particles in water, despite the high percentage of the hydrophobic monomer.

Figure 8:
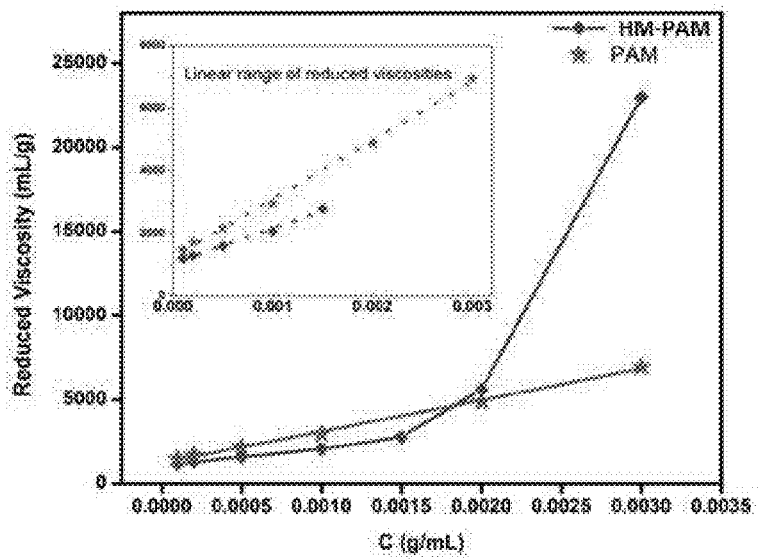
FIG. 8 illustrates a rate of change of reduced viscosity of the hydrophobically modified copolymer nanostructure versus concentration at room temperature.
Figure 9A:
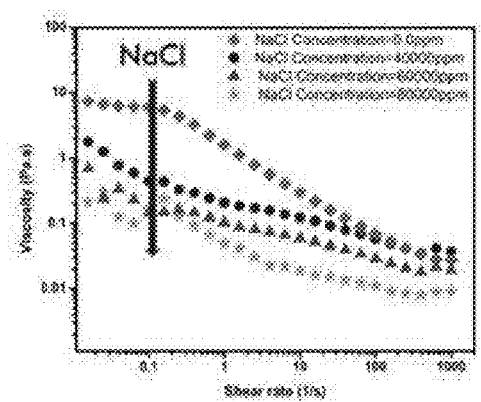
FIGS. 9A and 9B show a rate of change of viscosity of the hydrophobically modified copolymer nanostructure and HPAM versus shear rate at different salinity at room temperature.
Figure 9B:
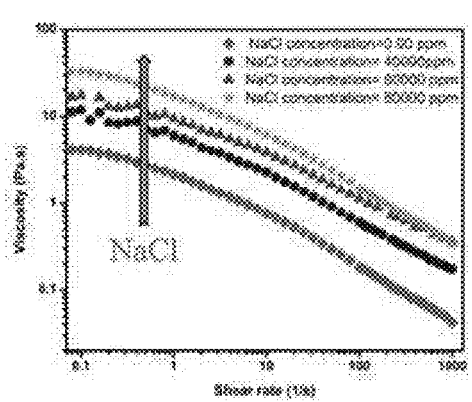

FIG. 8 illustrates the intrinsic viscosity of the copolymer and the non-modified viscosity of the PAM versus the concentration. To calculate the intrinsic viscosity, Equation (1) below was used:

$$\eta_{red}=[\eta]+k_H[\eta]^2 C_p \quad \text{Eqn. (1)}$$

Where $\eta_{red}$ is reduced viscosity, $\eta$ is the intrinsic viscosity, $k_H$ is the Huggins constant and $C_p$ is the polymer concentration.

As can be seen in FIG. 8, the polyacrylamide's reduced viscosity is linear. However, in case of the salt-resistant hydrophobically modified HM-PAM, this correlation spikes at a specific concentration (critical concentration). At the critical concentration, the hydrophobic intra-actions of the hydrophobic groups change to molecular interactions, which lead to sudden increase in viscosity of the copolymer. According to rheological measurements, increasing the hydrophobia content up to 10 mol % makes an enhancement in viscosity of HM-PAM copolymers due to hydrophobic association in aqueous solutions with formation of hydrophobic micro-domains, which become more pronounced above the critical concentration of copolymer in water.

Reference is now made to FIGS. 9A-12. As mentioned hereinabove, use of PAM and HPAM in polymer flooding processes is known. These polymers increase the water viscosity, hindering water-fingering phenomena and, as long as these properties remain intact, operate to push the oil forward or to the front for retrieval. PAM and HPAM employ maximum chain extension to obtain high molecular weight of the polymers, and repulsion between the negative charges along the polymer chain. The chain extension approach, though, creates inherent vulnerability to degradations during flooding processes. For example, when polyvalent salts are used in oilfield brine solutions, negative charges are extended from each other along the polymer chain by interaction with cations in the solution. The polymer chains, as a result, no longer extend fully. This can cause the solution to have decreased viscosity due to strong ion-dipole interaction between the salt cations and the oxygen atoms in polyacrylamide molecules. The strong ion-dipole interaction between the divalent cations, $Ca^{2+}$ and $Mg^{2+}$ and the amide group can establish higher charge densities than $Na^+$, and thereby weaken the bond strengths of NaH and C═O bonds. The weakened bond strengths can cause chemical degradation of polymer molecules and an associated decrease of the polymer solution viscosity. On the other hand, the flow behavior index decreases with increasing polymer concentration, and slightly increases at high temperature. Therefore, it should be understood that a higher HPAM concentration leads to higher viscosities, and polymer viscosity is reduced at a higher shear rate (FIG. 9A) and temperature (FIGS. 11A and 11B).

Figure 10:
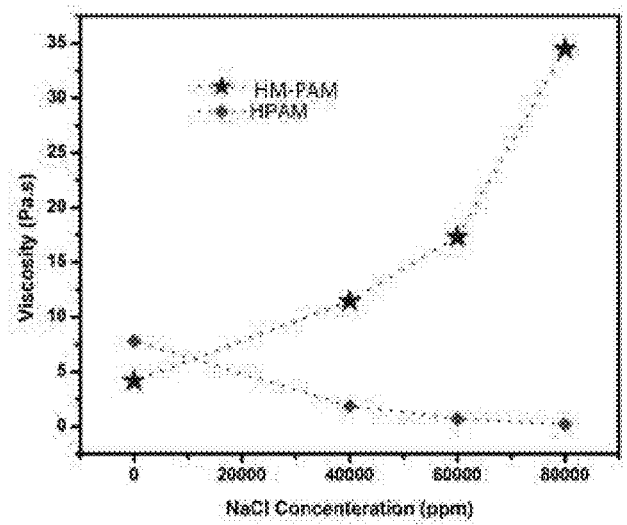
FIG. 10 illustrates a rate of change of viscosity of the solutions of hydrophobically modified copolymer nanostructure and HPAM at different salinity and fixed shear rate at room temperature.
Figures 11A, 11B:
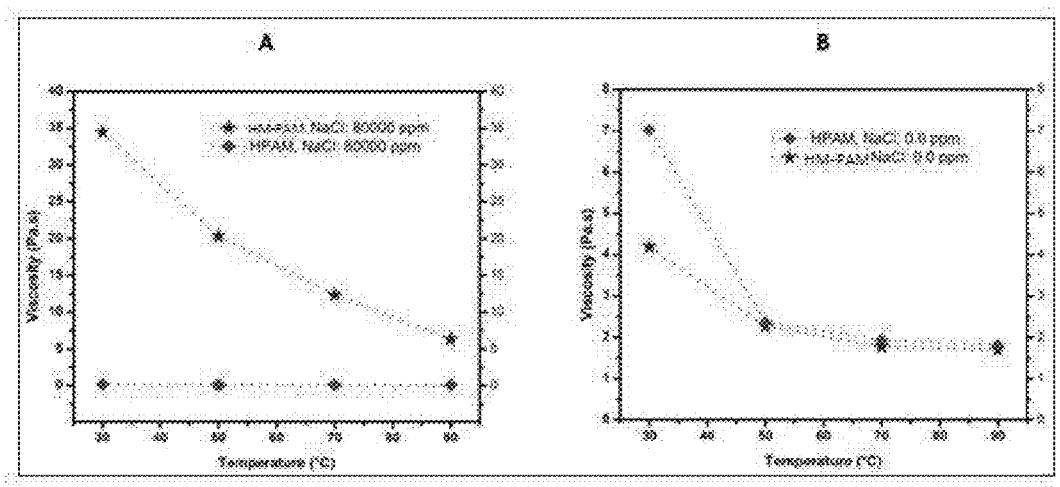
FIGS. 11A and 11B illustrate, respectively, a viscosity of the hydrophobically modified copolymer nanostructure and HPAM at fixed shear rate and different temperature and salinities.

Synthesized salt-resistant hydrophobically modified HM-PAM nanostructures according to disclosed concepts and aspects thereof do not contain anionic groups. Therefore, the viscosity of the HM-PAM becomes stable as the salinity and the temperature of the medium change. This makes the present hydrophobically modified copolymer nanostructure advantageous for use in flooding process in enhanced oil recovery, since ionic groups could cover the ionic carboxylate groups in HPAM, and therefore aggregates this polymer. At higher concentrations, it could lead to polymer precipitation and sudden decrease in viscosity of the HPAM. FIG. 10 illustrates the comparison between the change of viscosity of the HPAM and HM-PAM versus the water salinity. As can be seen, the presence of salt ions increases the polarity of the water, which causes increase in molecular interactions in the HM-PAM, therefore increase in viscosity of the HM-PAM copolymer nanostructures.

In addition, shearing and heating in wellbores and reservoirs often decrease the polymer viscosity. Polymer solutions, as any non-Newtonian fluid, conform to the power law, including viscosity, shear rate, consistency index, and flow behavior index. The polymer solution viscosity is thus easily calculated under any shear rate based on the determined consistency and flow behavior indexes as with any fluid.

Figure 12:
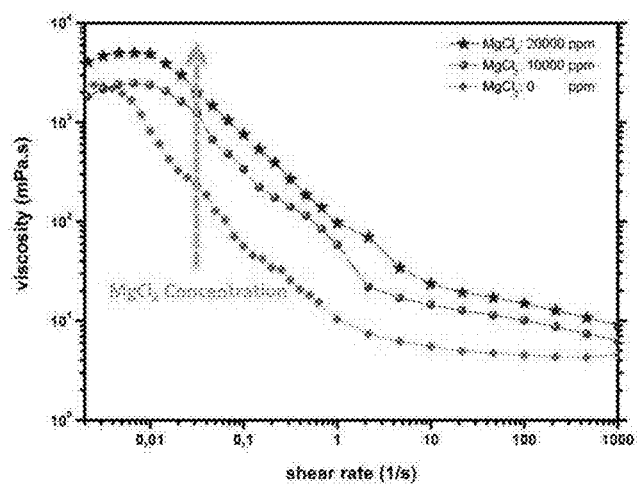
FIG. 12 illustrates a rate of change of viscosity of the solutions of hydrophobically modified copolymer nanostructure versus shear rate at different divalent cations ($Mg^{2+}$).

FIG. 12 shows a rate of change of viscosity of the solutions of hydrophobically modified copolymer nanostructure versus shear rate at different divalent cations ($Mg^{2+}$). In case of conventional polymers such as HPAM, in hard water (with high contents of $Ca^{2+}$ and $Mg^{2+}$) precipitation may occur due to complexing ability of the carboxylate groups of HPAM and resulting in a rapid decreasing of viscosity. Many oil fields inject seawater as injection water which contains these divalent ions. Furthermore, during EOR process, the polymer will be in contact with the underground water containing monovalent and divalent ions, which have a great influence on the properties of polymers in aqueous solution. However, hydrophobically modified copolymer nanostructures, contrary to most of conventional polymers, not only are stable in the presence of monovalent and divalent ions, but also a significant enhancement of viscosity may be observed with increasing the divalent ions.

Other implementations are contemplated.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations. This is for purposes of streamlining the disclosure, and is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

What is claimed is:

1. A method of producing a hydrophobically modified copolymer nanostructure, the method comprising;
    adding a hydrophilic monomer, an osmotic agent and a surfactant to an organic solvent to produce a nano-emulsion;
    adding a hydrophobic monomer to the produced nano-emulsion and an oil-soluble initiator to start a reaction and produce the hydrophobically modified copolymer; and
    recovering the hydrophobically modified copolymer nanostructure from the organic solvent.

2. The method of claim 1, wherein producing the nano-emulsion includes adding the hydrophilic monomer, osmotic agent and the surfactant to the organic solvent and stirring the mixture.

3. The method of claim 2, wherein the osmotic agent includes a sodium hydroxide solution.

4. The method of claim 2, wherein the surfactant includes a surfactant with HLB of 2-6.

5. The method of claim 2, wherein:
    the organic solvent includes cyclohexane, benzene or heptane.

6. The method of claim 2, wherein:
    the initiator includes an oil-soluble initiator, and
    the oil-soluble initiator includes azobisisobutyronitrile (AIBN), benzoyl peroxide (BPO) or lauroyl peroxide (LPO).

7. The method of claim 2, wherein:
    the osmotic agent includes a sodium hydroxide solution,
    the organic solvent includes cyclohexane, benzene or heptane,
    the initiator includes an oil-soluble initiator, and
    the oil-soluble initiator includes benzoyl peroxide (BPO), lauroyl peroxide (LPO) or azobisisobutyronitrile (AIBN).

8. The method of claim 1, further comprising polymerizing the hydrophobic monomer, wherein the polymerizing includes adding the hydrophobic monomer to the nano-emulsion while under mechanical stirring, to form micelles, and then adding the initiator of the reaction to synthesize the hydrophobically modified copolymer nanostructure as a hydrophobic/hydrophilic polymer.

9. The method of claim 8, wherein producing the nano-emulsion includes adding the hydrophilic monomer, the osmotic agent and the surfactant to the organic solvent and stirring the mixture.

10. The method of claim 9, wherein:
    the osmotic agent includes a sodium hydroxide solution,
    the organic solvent includes cyclohexane, benzene or heptane,
    the initiator includes benzoyl peroxide (BPO), lauroyl peroxide (LPO) or azobisisobutyronitrile (AIBN).

11. The method of claim 1, wherein polymerizing leaves unreacted monomers and unreacted surfactant, and wherein recovering the hydrophobically modified copolymer nanostructure comprises rinsing the hydrophobically modified copolymer nanostructure by methanol to separate unreacted monomers and unreacted surfactant from the hydrophobically modified copolymer nanostructure.

12. The method of claim 11, wherein recovering the hydrophobically modified copolymer nanostructure further comprises drying the hydrophobically modified copolymer nanostructure under vacuum.

* * * * *